United States Patent
Hong

(10) Patent No.: US 10,826,057 B2
(45) Date of Patent: *Nov. 3, 2020

(54) MIXED POSITIVE ELECTRODE ACTIVE MATERIAL, POSITIVE ELECTRODE COMPRISING SAME, AND SECONDARY BATTERY

(71) Applicant: LG Chem, Ltd., Seoul (KR)

(72) Inventor: Yeon-Suk Hong, Daejeon (KR)

(73) Assignee: LG Chem, Ltd. (KR)

( * ) Notice: Subject to any disclaimer, the term of this patent is extended or adjusted under 35 U.S.C. 154(b) by 44 days.

This patent is subject to a terminal disclaimer.

(21) Appl. No.: 16/241,208

(22) Filed: Jan. 7, 2019

(65) Prior Publication Data

US 2019/0140264 A1 May 9, 2019

Related U.S. Application Data

(63) Continuation-in-part of application No. 15/517,641, filed as application No. PCT/KR2015/014041 on Dec. 21, 2015, now Pat. No. 10,199,641.

(30) Foreign Application Priority Data

Dec. 19, 2014 (KR) .................. 10-2014-0184875

(51) Int. Cl.
*H01M 4/36* (2006.01)
*H01M 4/62* (2006.01)
(Continued)

(52) U.S. Cl.
CPC .......... *H01M 4/364* (2013.01); *H01M 4/131* (2013.01); *H01M 4/366* (2013.01); *H01M 4/483* (2013.01);
(Continued)

(58) Field of Classification Search
CPC ...... H01M 4/364; H01M 4/525; H01M 4/625; H01M 4/131; H01M 4/505; H01M 4/366
See application file for complete search history.

(56) References Cited

U.S. PATENT DOCUMENTS

2002/0119372 A1 8/2002 Zhang
2006/0257745 A1 11/2006 Choi et al.
(Continued)

FOREIGN PATENT DOCUMENTS

JP  H09330720 A  12/1997
JP  20040026378 A  1/2004
(Continued)

OTHER PUBLICATIONS

International Search Report from PCT/KR2015/014041, dated May 4, 2016.

*Primary Examiner* — Matthew J Merkling
(74) *Attorney, Agent, or Firm* — Lerner, David, Littenberg, Krumholz & Mentlik, LLP

(57) ABSTRACT

Provided is a mixed positive electrode active material comprising a large-grain positive electrode active material with an average diameter of 10 μm or greater and a small-grain positive electrode active material with an average diameter of 5 μm or smaller, in which the large-grain positive electrode active material and the small-grain positive electrode active material are coated with different materials between a lithium boron oxide-based composition and metal oxide, respectively.

20 Claims, 1 Drawing Sheet

(51) Int. Cl.

| | |
|---|---|
| *H01M 4/485* | (2010.01) |
| *H01M 4/505* | (2010.01) |
| *H01M 4/525* | (2010.01) |
| *H01M 10/0525* | (2010.01) |
| *H01M 4/48* | (2010.01) |
| *H01M 4/131* | (2010.01) |
| *H01M 4/02* | (2006.01) |

(52) U.S. Cl.
CPC ............ *H01M 4/485* (2013.01); *H01M 4/505* (2013.01); *H01M 4/525* (2013.01); *H01M 4/622* (2013.01); *H01M 10/0525* (2013.01); *H01M 2004/028* (2013.01)

(56) References Cited

U.S. PATENT DOCUMENTS

| | | | | |
|---|---|---|---|---|
| 2015/0024280 | A1* | 1/2015 | Uchiyama | H01M 4/366 429/304 |
| 2015/0104704 | A1 | 4/2015 | Kim et al. | |
| 2015/0162598 | A1 | 6/2015 | Kim et al. | |
| 2017/0263920 | A1* | 9/2017 | Choi | H01M 10/0525 |
| 2017/0294643 | A1* | 10/2017 | Burshtain | H01M 4/1395 |

FOREIGN PATENT DOCUMENTS

| | | | |
|---|---|---|---|
| JP | 200636545 | A | 2/2006 |
| KR | 100458584 | B1 | 12/2004 |
| KR | 100975875 | B1 | 8/2010 |
| KR | 20140018685 | A | 2/2014 |
| KR | 20140025103 | A | 3/2014 |
| WO | 2014021665 | A1 | 2/2014 |

\* cited by examiner

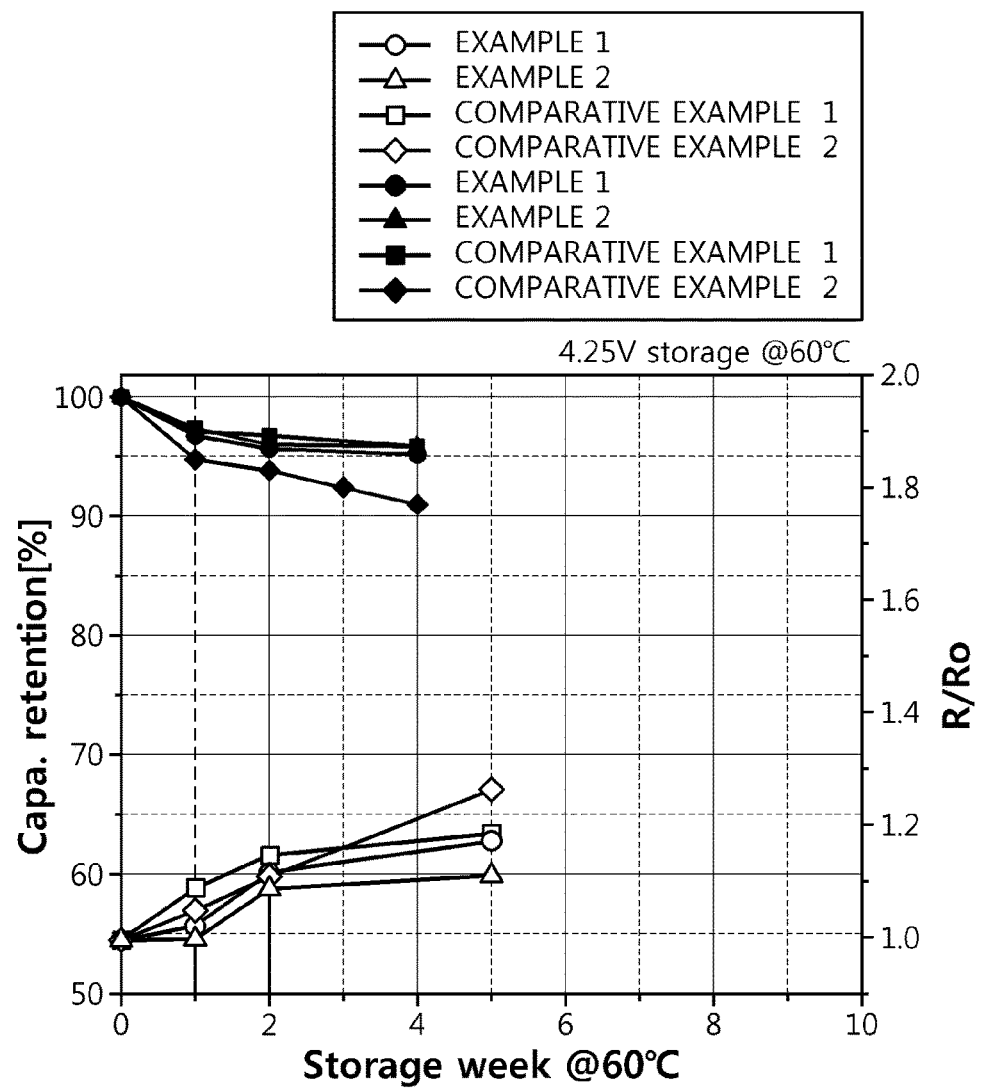

MIXED POSITIVE ELECTRODE ACTIVE MATERIAL, POSITIVE ELECTRODE COMPRISING SAME, AND SECONDARY BATTERY

CROSS-REFERENCE TO RELATED APPLICATIONS

This application is a continuation-in-part of U.S. application Ser. No. 15/517,641, filed on Apr. 7, 2017, which is a national phase entry under 35 U.S.C. § 371 of International Application No. PCT/KR2015/014041, filed on Dec. 21, 2015, which claims priority to Korean Patent Application No. 10-2014-0184875 filed on Dec. 19, 2014, the disclosures of which are incorporated herein by reference.

TECHNICAL FIELD

The present disclosure relates to a mixed positive electrode active material, a positive electrode comprising the same, and a secondary battery, and more particularly, to a mixed positive electrode active material of different materials, a positive electrode comprising the same, and a secondary battery.

BACKGROUND ART

Lithium secondary battery, recently used in an increased amount, mainly uses Li-containing cobalt oxide ($LiCoO_2$) as a positive electrode active material. Additionally, the use of Li-containing manganese oxide, such as, $LiMnO_2$ with layer crystal structure, and $LiMn_2O_4$ with a spinel crystal structure, and a Li-containing nickel oxide $LiNiO_2$, is also considered.

The Li-containing cobalt oxide ($LiCoO_2$) of the positive electrode active materials is currently widely used because of excellent overall properties such as superior cycle characteristic, and so on. However, the Li-containing cobalt oxide has several problems such as relatively high price, a low charging and discharging current amount, which is about 150 mAh/g, unstable crystal structure at 4.3 V of voltage or higher, risk of fire from reaction with an electrolyte, and so on.

In order to solve the problems, suggestions have been made, which include the technology for coating an outer surface of the Li-containing cobalt oxide ($LiCoO_2$) with a metal (e.g., aluminum) so as to allow operation at a high voltage, technology for thermally treating Li-containing cobalt oxide ($LiCoO_2$) or mixing with another material, and so on. However, a secondary battery composed of such positive material may show weak stability at a high voltage or may have limited application to a mass production process.

Because the lithium manganese oxide such as $LiMnO_2$ or $LiMn_2O_4$ has advantages of using the eco-friendly manganese which is plentiful as a raw material, it gathers many attentions as a positive electrode active material that can replace $LiCoO_2$, but the lithium manganese oxide has disadvantages such as small capacity and bad cycle characteristic.

The lithium nickel based oxide such as LiNiO2 costs less than the cobalt-based oxide, while it shows a high discharge capacity when charged at 4.3 V. Accordingly, a reversible capacity of the doped $LiNiO_2$ may approach to about 200 mAh/g which exceeds a capacity of $LiCoO_2$ (about 165 mAh/g). However, the $LiNiO_2$-based oxide has problems of rapid phase transition of a crystal structure according to a volume change accompanied with charge/discharge cycle, and generating of an excess gases during cycle.

In order to solve the above problem, there is suggested a lithium transition metal oxide, which is in a form in which a portion of nickel is substituted with another transition metal such as manganese, cobalt, and so on. The nickel-based lithium transition metal oxide substituted with metal has advantages of relatively excellent cycle characteristic and capacity characteristic. However, the cycle characteristic is rapidly lowered when used for a long time, and stability problem occurring from storing at a high temperature is not yet solved.

Further, as the recent mobile device gradually becomes high-functioned to provide various functions while being light-weighted and miniaturized continuously, and as attentions are received on the secondary battery as a power source of an electrical vehicle EV and a hybrid electrical vehicle HEV, which are suggested as methods for solving the air pollution of a gasoline vehicle and a diesel vehicle which use fossil fuel, use of the secondary battery is expected to further increase. Given this, attentions are growing for not only the above problems, but also the problems of battery stability and high-temperature storing characteristic at a state of high level capacity and high electrical potential.

Accordingly, a new technology for simultaneously solving problems of output and service life characteristics is highly requested.

DISCLOSURE

Technical Problem

The present disclosure is designed to solve the problems of the related art, and therefore, the present disclosure is directed to providing a mixed positive electrode active material simultaneously satisfying both output characteristic at a high voltage and service life characteristic at a high temperature, a positive electrode comprising the same, and a secondary battery.

The other objectives and advantages of the present disclosure can be understood with the following description and more clearly with the embodiments of the present disclosure. Also, it will be easily understood that the objects and advantages of the present disclosure may be realized by the means shown in the appended claims and combinations thereof.

Technical Solution

An aspect of the present disclosure provides a mixed positive electrode active material according to the following embodiments.

A first embodiment relates to a mixed positive electrode active material including a large-grain positive electrode active material having an average diameter of 10 µm or greater and a small-grain positive electrode active material having an average diameter of 5 µm or less, and a coating layer disposed on a surface of each of the large-grain positive electrode active material and the small-grain positive electrode active material, wherein the coating layers include different materials, wherein one of the materials is a lithium boron oxide-based composition and the other of the materials is a metal oxide.

In the first embodiment, a second embodiment relates to the mixed positive electrode active material, wherein the lithium boron oxide-based composition includes one of lithium metaborate, lithium triborate, lithium tetraborate, lithium pentaborate, lithium heptaborate and lithium octaborate, or mixtures of at least two of them.

In the first or second embodiment, a third embodiment relates to the mixed positive electrode active material, wherein the lithium boron oxide-based composition includes one of $LiBO_2$, $LiBO_3$, $LiB_3O_5$, $Li_2B_3O_7$, $Li_2B_4O$, $Li_2B_4O_7$, $Li_2B_5O_8$, $LiB_7O_{12}$, $Li_2B_8O_{13}$ and $Li_{10}B_8O_{24}$, or mixtures of at least two of them.

In any one of the first to third embodiments, a fourth embodiment relates to the mixed positive electrode active material, wherein the lithium boron oxide-based composition is derived from boron (B), a boron (B) compound or combinations thereof.

In the fourth embodiment, a fifth embodiment relates to the mixed positive electrode active material, wherein the boron (B) compound includes boric acid ($H_3BO_3$).

In the fourth embodiment, a sixth embodiment relates to the mixed positive electrode active material, wherein the coating layer including the lithium boron oxide-based composition is formed by mixing the positive electrode active material with the boron (B), the boron (B) compound or combination thereof, and performing thermal treatment.

In any one of the first to sixth embodiments, a seventh embodiment relates to the mixed positive electrode active material, wherein the coating layer including the metal oxide is formed by mixing the positive electrode active material with the metal oxide, and performing thermal treatment.

In any one of the first to seventh embodiments, an eighth embodiment relates to the mixed positive electrode active material, wherein the lithium in the coating layer including the lithium boron oxide-based composition is present in an amount of 0.05 to 0.2 parts by weight based on 100 parts by weight of the total weight of the large-grain positive electrode active material or the small-grain positive electrode active material.

In any one of the first to eighth embodiments, a ninth embodiment relates to the mixed positive electrode active material, wherein the metal oxide includes one of magnesium oxide, alumina, niobium oxide, titanium oxide and tungsten oxide, or mixtures of at least two of them.

In any one of the first to ninth embodiments, a tenth embodiment relates to the mixed positive electrode active material, wherein a weight ratio between the large-grain positive electrode active material including the coating layer and the small-grain positive electrode active material including the coating layer is 5:5 to 8:2.

In any one of the first to tenth embodiments, an eleventh embodiment relates to the mixed positive electrode active material, wherein at least one of the large-grain positive electrode active material and the small-grain positive electrode active material is lithium·nickel·manganese·cobalt complex oxide (NMC).

In the eleventh embodiment, a twelfth embodiment relates to the mixed positive electrode active material, wherein the lithium·nickel·manganese·cobalt complex oxide is $Li_{(1+\delta)}Mn_xNi_yCo_{(1-x-y-z)}M_zO_2$ (M is at least one element selected from the group consisting of Ti, Zr, Nb, Mo, W, Al, Si, Ga, Ge and Sn, and $-0.15<\delta<0.15$, $0.1 \le x \le 0.5$, $0.6 \le x+y+z<1.0$, $0 \le z \le 0.1$).

Another aspect of the present disclosure provides a positive electrode according to the following embodiments.

A thirteenth embodiment relates to a positive electrode including an electrode current collector, and a positive electrode active material layer formed on at least one surface of the electrode current collector and including the mixed positive electrode active material according to any one of the first to twelfth embodiments, a conductor and a binder.

In the thirteenth embodiment, a fourteenth embodiment relates to the positive electrode, wherein the conductor is at least one selected from the group consisting of graphite, carbon black, acetylene black, ketjen black, channel black, furnace black, lamp black, thermal black, carbon fiber, metal fiber, fluorocarbon, aluminum powder, nickel powder, zinc oxide, potassium titanate and titanium oxide, and the binder is at least one selected from the group consisting of polyvinylidene fluoride, vinylidene fluoride-hexafluoropropylene copolymer (PVDF-co-HFP), polyvinyl alcohol, carboxymethyl cellulose (CMC), starch, hydroxypropylcellulose, regenerated cellulose, polyvinylpyrrolidone, polytetrafluoroethylene, polyethylene, polypropylene, ethylene-propylene-diene ter polymer (EPDM), sulfonated EPDM, styrene butadiene rubber (SBR), fluorine rubber, polyacrylonitrile and polymethylmethacrylate.

In the thirteenth or fourteenth embodiment, a fifteenth embodiment relates to the positive electrode, wherein the positive electrode is for a secondary battery.

Still another aspect of the present disclosure provides a method for fabricating a mixed positive electrode active material according to the following embodiments.

A sixteenth embodiment relates to a method for fabricating a mixed positive electrode active material including (S1) preparing a large-grain positive electrode active material having an average diameter of 10 μm or greater and a small-grain positive electrode active material having an average diameter of 5 μm or less, (S2) mixing the large-grain positive electrode active material or the small-grain positive electrode active material with boron (B), a boron (B) compound or combination thereof, and performing thermal treatment to form a coating layer including a lithium boron oxide-based composition on a surface of the large-grain positive electrode active material or the small-grain positive electrode active material, (S3) mixing the positive electrode active material that has not gone through the (S2) among the large-grain positive electrode active material and the small-grain positive electrode active material with a metal oxide, and performing thermal treatment to form a coating layer including metal oxide on a surface of the positive electrode active material, and (S4) mixing the results of the (S2) and the (S3), a conductor and a binder.

In the sixteenth embodiment, a seventeenth embodiment relates to the method for fabricating a mixed positive electrode active material, wherein the thermal treatment in the step of forming the coating layer including the lithium boron oxide-based composition is performed between 250 and 500° C., and the thermal treatment in the step of forming the coating layer including the metal oxide is performed between 300 and 800° C.

In the sixteenth or seventeenth embodiment, an eighteenth embodiment relates to the method for fabricating a mixed positive electrode active material, wherein the thermal treatment is performed under an atmospheric environment.

In any one of the sixteenth to eighteenth embodiments, a nineteenth embodiment relates to the method for fabricating a mixed positive electrode active material, wherein the boron (B), the boron (B) compound or combination thereof is present in an amount of 0.05 to 0.2 parts by weight based on 100 parts by weight of the total weight of the positive electrode active material.

In any one of the sixteenth to nineteenth embodiments, a twentieth embodiment relates to the method for fabricating a mixed positive electrode active material, wherein the metal oxide is present in an amount of 0.05 to 0.2 parts by weight based on 100 parts by weight of the total weight of the positive electrode active material.

Advantageous Effects

The present disclosure gives the following effects. The present disclosure has an advantage of providing a positive electrode having excellent rolling density, by mixing two types of positive electrode active materials having different average diameters.

Further, the present disclosure has an advantage of providing a secondary battery simultaneously enhanced with output characteristic and high-temperature service life characteristic, by using heterogeneous positive electrode active materials respectively coated with a lithium boron oxide-based composition and metal oxide.

DESCRIPTION OF DRAWINGS

The accompanying drawings illustrate preferred embodiments of the present disclosure and, together with the foregoing disclosure, serve to provide further understanding of the technical spirit of the present disclosure. However, the present disclosure should not be construed as being limited to the drawings.

The FIGURE is a graph illustrating recovery capacity and resistance change of Example 1 and 2, and Comparative Examples 1 and 2.

BEST MODE

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the embodiments disclosed in the present specification and the configurations illustrated in the drawings are merely the most preferred embodiments of the present disclosure, and not all of them represent the technical ideas of the present disclosure, and thus it should be understood that there may be various equivalents and modified examples that could substitute therefor at the time of filing the present application.

A mixed positive electrode active material according to an embodiment may include two types of positive electrode active materials having different diameters, and preferably, may be a mixture of a large-grain positive electrode active material having an average diameter of 10 μm or greater, and a small-grain positive electrode active material having an average diameter of 5 μm or less.

When two types of the positive electrode active materials having different diameters are mixed, pores between the large-grain positive electrode active materials may be filled with the small-grain positive electrode active material. Therefore, a current collector may be coated with a high rolling density, and ultimately, a positive electrode and a battery having excellent energy density may be fabricated.

Examples of the positive electrode active material applicable in the present disclosure are not limited, and thus may include any material as long as it can allow ion intercalation-deintercalation during charge and discharge. Preferably, the material may be lithium·nickel·manganese·cobalt complex oxide (NMC), or more specifically, the material may be $Li_{(1+\delta)}Mn_xNi_yCo_{(1-x-y-z)}M_zO_2$ (M is at least one element selected from the group consisting of Ti, Zr, Nb, Mo, W, Al, Si, Ga, Ge and Sn, and $-0.15<\delta<0.15$, $0.1 \leq x \leq 0.5$, $0.6<x+y+z<1.0$, $0 \leq z \leq 0.1$).

The large-grain positive electrode active material may have an average diameter of 10 μm or greater, and preferably, from 10 μm and 20 μm. When the average diameter is less than 10 μm, there is a problem in which an elementary particle is difficult to be included due to small pore.

Further, the small-grain positive electrode active material may have an average diameter of 5 μm or less, preferably 1 μm to 5 μm, more preferably 3 μm to 5 μm. In this case, when the average diameter exceeds 5 μm, there is a problem in which an elementary particle is difficult to be included within the pore formed by the large-grain positive electrode active material.

The mixed positive electrode active material according to an embodiment of the present disclosure includes the large-grain positive electrode active material and the small-grain positive electrode active material each coated with different materials, in which the different materials are a lithium boron oxide (LBO)-based composition and a metal oxide.

Specifically, the mixed positive electrode active material may be the large-grain positive electrode active material having a coating layer including a lithium boron oxide-based composition-the small-grain positive electrode active material having a coating layer including a metal oxide, or the small-grain positive electrode active material having a coating layer including a lithium boron oxide-based composition-the large-grain positive electrode active material having a coating layer including a metal oxide, and preferably, the small-grain positive electrode active material having a coating layer including a lithium boron oxide-based composition-the large-grain positive electrode active material having a coating layer including a metal oxide.

In a specific embodiment of the present disclosure, the lithium boron oxide-based composition may include one of lithium metaborate, lithium triborate, lithium tetraborate, lithium pentaborate, lithium heptaborate and lithium octaborate, or mixtures of at least two of them.

In a specific embodiment of the present disclosure, the lithium boron oxide-based composition may include one of $LiBO_2$, $LiBO_3$, $LiB_3O_5$, $Li_2B_3O_7$, $Li_2B_4O$, $Li_2B_4O_7$, $Li_2B_5O_8$, $LiB_7O_{12}$, $Li_2B_8O_{13}$ and $Li_{10}B_8O_{24}$, or mixtures of at least two of them.

In a specific embodiment of the present disclosure, the lithium boron oxide-based composition may be derived from boron (B), a boron (B) compound or combinations thereof.

In this instance, the boron (B) compound may include boric acid ($H_3BO_3$).

In a specific embodiment of the present disclosure, the coating layer including the lithium boron oxide-based composition may be formed by mixing the positive electrode active material; with the boron (B), the boron (B) compound or combinations thereof, and performing thermal treatment.

In this instance, the thermal treatment may be performed between 250 and 500° C.

The coating layer including the metal oxide may be formed by mixing the positive electrode active material with the metal oxide and performing thermal treatment, and in this instance, the thermal treatment may be performed between 300 and 800° C.

Additionally, the thermal treatment may be performed under an atmospheric environment.

In a specific embodiment of the present disclosure, the coating layer coated on the surface of the positive electrode active material may cover the surface of the positive electrode active material in part or in whole.

In a specific embodiment of the present disclosure, the lithium in the coating layer including the lithium boron oxide-based composition may be present in an amount of 0.05 to 0.2 parts by weight based on 100 parts by weight of the total weight of the large-grain positive electrode active material or the small-grain positive electrode active material.

The mixed positive electrode active material according to an embodiment may be formed in a way in which the large-grain positive electrode active material and the small-grain positive electrode active material are respectively coated with different materials between lithium triborate and metal oxide.

Specifically, the mixture may be a mixture of large-grain positive electrode active material coated with lithium triborate/small-grain positive electrode active material coated with metal oxide, or a mixture of small-grain positive electrode active material coated with lithium triborate/large-grain positive electrode active material coated with metal oxide, and preferably, the mixture of small-grain positive electrode active material coated with lithium triborate/large-grain positive electrode active material coated with metal oxide may be provided.

In one example, for the metal oxide, any material may be used without limitations as long as it may be coated on the positive electrode active material and have excellent stability at a high voltage. Examples may include, without limitation, transition metal oxide such as Nb, Ti, Zn, Sn, Zr, and W, lantanide metal oxide such as Ce, as well as relatively light metal oxide such as Mg, Al, B, and Si, and preferably, Mg, Al, Nb, Ti, and W.

In a specific embodiment of the present disclosure, the metal oxide may include one of magnesium oxide, alumina, niobium oxide, titanium oxide and tungsten oxide, or mixtures of at least two of them.

The positive electrode active material according to an embodiment may use the large-grain positive electrode active material including the coating layer and the small-grain positive electrode active material including the coating layer mixed at a weight ratio of 5:5 to 8:2, and preferably, at a weight ratio of 6:4 to 7:3. When the amount of the large-grain positive electrode active material is less than 50 wt %, it results in a small number of the pores formed by the large-grain material, making it difficult to reduce packing density with the small-grain material. When the amount of the large-grain positive electrode active material exceeds 80 wt %, the effect of improving output by the small-grain material becomes inadequate.

According to another aspect of the present disclosure, the above-described mixed positive electrode active material is prepared by the following method:

(S1) preparing a large-grain positive electrode active material having an average diameter of 10 μm or greater and a small-grain positive electrode active material having an average diameter of 5 μm or less;

(S2) mixing the large-grain positive electrode active material or the small-grain positive electrode active material with boron (B), a boron (B) compound, or combinations thereof and performing thermal treatment to form a coating layer including a lithium boron oxide-based composition on the surface of the large-grain positive electrode active material or the small-grain positive electrode active material;

(S3) mixing the positive electrode active material that has not gone through (S2) among the large-grain positive electrode active material and the small-grain positive electrode active material with a metal oxide and performing thermal treatment to form a coating layer including metal oxide on the surface of the positive electrode active material; and (S4) mixing the results of (S2) and (S3), a conductor and a binder.

In this instance, for the positive electrode active material, the lithium boron oxide-based composition and the metal oxide used, a reference is made to the above description.

In a specific embodiment of the present disclosure, the boron (B), the boron (B) compound, or combinations thereof may be thermally treated between 250 and 500° C., and the metal oxide may be thermally heated between 300 and 800° C.

In a specific embodiment of the present disclosure, the thermal treatment may be performed under an atmospheric environment.

In a specific embodiment of the present disclosure, the boron (B), the boron (B) compound, or combination thereof may be present in an amount of 0.05 to 0.2 parts by weight based on 100 parts by weight of the total weight of the positive electrode active material.

In a specific embodiment of the present disclosure, the metal oxide may be present in an amount of 0.05 to 0.2 parts by weight based on 100 parts by weight of the total weight of the positive electrode active material.

The positive electrode according to another embodiment may include an electrode current collector, and a positive electrode active material formed on at least one surface of the electrode current collector and including the mixed positive electrode active material described above, a conductor and a binder.

The electrode current collector may not be limited to any specific material as long as it has conductivity and does not cause a chemical change in the related art, and may include, for example, stainless steel, aluminum, nickel, titanium, sintered carbon, or, aluminum or stainless steel surface-treated with carbon, nickel, titanium, silver, and so on. Further, the electrode current collector may have micro bumps formed on the surface thereof to enhance the adhesion strength of the positive electrode active material, may have various forms such as film, sheet, foil, net, porous body, foam, nonwoven fabric, and so on, and may have a thickness of 3 μm to 500 μm.

The conductor may not be limited to any specific example as long as it has conductivity and does not cause a chemical change in the related art, and may use a conductive material such as graphite such as natural graphite or artificial graphite; carbon black such as carbon black, acetylene black, ketjen black, channel black, furnace black, lamp black, or thermal black; conductive fiber such as carbon fiber or metal fiber; metal powder such as fluorocarbon, aluminum, or nickel powder; conductive whisker such as zinc oxide or potassium titanate; conductive metal oxide such as titanium oxide; and polyphenylene derivatives. Preferably, the conductor may be at least one selected from the group consisting of graphite, carbon black, acethylene black, ketjen black, channel black, furnace black, lamp black, thermal black, carbon fiber, metal fiber, fluorocarbon, aluminum powder, nickel powder, zinc oxide, potassium titanate, and titanium oxide, and may generally be added in an amount from about 1 wt % to 20 wt % based on the total weight of the mixture including the mixed positive electrode active material.

Further, any component may be used as the binder applicable in the present disclosure without limitations as long as the component contributes to bonding of the mixed positive electrode active material and the conductor and bonding to the electrode current collector, and may preferably be at least one selected from the group consisting of polyvinylidene fluoride, vinyldene fluoride-hexafluoropropylene copolymer (PVDF-co-HFP), polyvinyl alcohol, carboxymethyl cellulose (CMC), starch, hydroxypropylcellulose, regenerated cellulose, polyvinylpyrrolidone, polytetrafluoroethylene, polyethylene, polypropylene, ethylene-propylene-diene ter polymer (EPDM), sulfonated EPDM, styrene butadiene rubber (SBR), fluorine rubber, polyacrylonitrile and polymethylmethacrylate and may generally be added in an amount from 1 wt % to 20 wt % based on the total weight of the mixture including the positive electrode active material.

Further, the positive electrode according to an embodiment may optionally include a filler, and the filler applicable in the present disclosure may not be specifically limited as long as it is fibrous material that does not cause a chemical change in corresponding battery. Non-limiting examples may include olefin-based polymer such as polyethylene and polypropylene; and fibrous material such as glass fiber or carbon fiber.

The secondary battery including the positive electrode described above according to another embodiment may be provided, in which the secondary battery may preferably be a lithium secondary battery, and the secondary battery may have a driving voltage of 4.25 or greater.

The lithium secondary battery may be composed of the positive electrode described above, a negative electrode, a separator, and a Li-containing nonaqueous electrolyte, and the other components of the lithium secondary battery according to an embodiment excluding the positive electrode will be explained below.

The negative electrode may be fabricated by applying and drying a negative electrode material on a negative electrode current collector, and as necessary, the components described above may be further included.

The negative electrode material may include, for example, carbon such as hard carbon or graphite carbon; metal complex oxide such as $Li_xFe_2O_3(0 \leq x \leq 1)$, $Li_xWO_2(0 \leq x \leq 1)$, $Sn_xMe_{1-x}$, $Me'_yO_z$ (Me: Mn, Fe, Pb, Ge; Me': Al, B, P, Si, 1, 2, 3 family elements of the periodic table, halogen; $0 < x \leq 1$; $1 \leq y \leq 3$; $1 \leq z \leq 8$); lithium metal; lithium alloy; silicon alloy; tin alloy; metal oxide such as SnO, $SnO_2$, PbO; conductive polymer such as polyacetylene; and Li—Co—Ni materials.

The negative electrode current collector is generally fabricated to a thickness from 3 μm to 500 μm. The negative electrode current collector may not be limited to any specific material as long as it has conductivity and does not cause a chemical change in corresponding battery, and may include, for example, copper, stainless steel, aluminum, nickel, titanium, sintered carbon, copper or stainless steel surface-treated with carbon, nickel, titanium, silver, and so on, aluminum-cadmium alloy, and so on. Further, likewise the positive electrode current collector, the negative electrode current collector may have increased adhesion by having micro bumps formed on the surface thereof, and may be used in various forms such as film, sheet, foil, net, porous body, foam, nonwoven fabric, and so on.

The separator may be interposed between the positive electrode and the negative electrode, and a thin insulating film having high ion penetration and mechanical strength may be used. A pore diameter of the separator may be generally from 0.01 μm to 10 μm, and a thickness may be generally from 5 μm to 300 μm. The separator may be, for example, olefin-based polymer such as polypropylene with the chemical resistance and the hydrophobic property; and a sheet or nonwoven fabric made from glass fiber or polyethylene. When the solid electrolyte such as polymer is used for the electrolyte, the solid electrolyte may act also as the separator.

Li-containing nonaqueous electrolyte may be composed of nonaqueous electrolyte and lithium salt. For the nonaqueous electrolyte, nonaqueous electrolytic solvent, solid electrolyte, and inorganic solid electrolyte may be used.

The nonaqueous electrolytic solvent may include, for example, aprotic organic solvent such as N-methyl-2-pyrrolidinone, propylene carbonate, ethylene carbonate, butylene carbonate, dimethyl carbonate, diethyl carbonate, gamma-butyrolactone, 1,2-dimethoxyethane, tetrahydroxyfranc, 2-methyl tetrahydrofuran, dimethylsulfoxide, 1,3-dioxolane, formamide, dimethylformamide, dioxolane, acetonitrile, nitromethane, form acid methyl, methyl acetate, phosphoric acid triester, trimethoxy methane, dioxolane derivatives, sulforan, methyl sulforan, 1,3-dimethyl-2-imidazolidinone, propylene carbonate derivatives, tetrahydrofuran derivatives, ether, pyropionic methyl, and propionic ethyl.

The organic solid electrolyte may include, for example, polyethylene derivatives, polyethylene oxide derivatives, polypropylene oxide derivatives, phosphoric acid ester polymer, poly agitation lysine, polyester sulfide, polyvinyl alcohol, polyvinylidene fluoride, and a polymer including ionic dissociable group.

The inorganic solid electrolyte may include, for example, nitride, halide, and sulphate of lithium, such as $Li_3N$, LiI, $Li_5NI_2$, $Li_3N$-LiI-LiOH, $LiSiO_4$, $LiSiO_4$-LiI-LiOH, $Li_2SiS_3$, $Li_4SiO_4$, $Li_4SiO_4$-LiI-LiOH, and $Li_3PO_4$-$Li_2S$-$SiS_2$.

The lithium salt is a material that is readily soluble in the nonaqueous electrolyte described above, and may include, for example, LiCl, LiBr, LiI, $LiCO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_3Li)$, $(CF_3SO_2)_2NLi$, chloroborane lithium, lower aliphatic carboxylic acid lithium, lithium tetraphenyl borate, and imides.

For the enhancement of the charge/discharge characteristics, flame retardancy, and so on, the nonaqueous electrolyte may be added with, for example, pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salt, pyrrole, 2-methoxy ethanol, aluminum trichloride, and so on. According to embodiments, in order to impart flame retardancy, the nonaqueous electrolyte may further contain halogen-containing solvents such as carbon tetrachloride and ethylene trifluoride. Further, in order to improve high-temperature storage characteristic, the nonaqueous electrolyte may further contain carbon dioxide gas, and may further include fluoro-ethylene carbonate (FEC), propene sultone (PRS), fluoro-propylene carbonate (FPC) and so on.

Hereinafter, for more specified description, the present disclosure will be described in detail with reference to Examples. However, the Examples according to the present disclosure can be modified in various forms, and the scope of the present disclosure is not to be construed as being limited to the Examples described below. The Examples according to the present disclosure are provided in order to give more complete description of the present disclosure to those having average knowledge in the art.

Example 1

100 parts by weight of positive electrode active material $LiMn_{0.2}Ni_{0.6}Co_{0.2}O_2$ having an average diameter of 10 μm were mixed with 0.1 parts by weight of alumina ($Al_2O_3$), and thermally treated at 500° C. in an atmospheric environment to prepare positive electrode active material particles A having a coating layer on the surface of the positive electrode active material.

Subsequently, 100 parts by weight of positive electrode active material $LiMn_{0.2}Ni_{0.6}Co_{0.2}O_2$ having an average diameter of 5 µm were mixed with 0.1 parts by weight of boric acid ($H_3BO_3$), and thermally treated at 300° C. in an atmospheric environment to prepare positive electrode active material particles B having a coating layer on the surface of the positive electrode active material.

The mixed positive electrode active material was fabricated by mixing the positive electrode active material particles A and the positive electrode active material particles B at a weight ratio of 70:30, and then the positive electrode was fabricated by mixing the mixed positive electrode active material, the conductor (carbon black), and the binder (polyvinylidene fluoride) respectively in 92.5:3.5:4 of a weight ratio and coating the result on the electrode current collector, after which the secondary battery was fabricated by inserting the separator between the positive electrode and the negative electrode, which are fabricated above, and sealing with an aluminum pouch case.

Example 2

100 parts by weight of positive electrode active material $LiMn_{0.2}Ni_{0.6}Co_{0.2}O_2$ having an average diameter of 10 µm were mixed with 0.1 parts by weight of boric acid ($H_3BO_3$), and thermally treated at 300° C. in an atmospheric environment to prepare positive electrode active material particles C having a coating layer on the surface of the positive electrode active material.

Subsequently, 100 parts by weight of positive electrode active material $LiMn_{0.2}Ni_{0.6}Co_{0.2}O_2$ having an average diameter of 5 µm were mixed with 0.1 parts by weight of alumina ($Al_2O_3$), and thermally treated at 500° C. in an atmospheric environment to prepare positive electrode active material particles D having a coating layer on the surface of the positive electrode active material.

The secondary battery may be fabricated with the same method used in Example 1 except that the mixed positive electrode active material used herein was fabricated by mixing the positive electrode active material particles C and the positive electrode active material particles DF at a weight ratio of 70:30.

Comparative Example 1

The positive electrode active material was fabricated by solely using the positive electrode active material particles C, after which the positive electrode was fabricated by mixing the conductor (carbon black) and the binder (polyvinylidene fluoride) respectively in a weight ratio of 92.5: 3.5:4 and coating the result on the electrode current collector. The secondary battery was then fabricated by inserting the separator between the positive electrode and the negative electrode, which are fabricated as described above, and sealing with the aluminum pouch case.

Comparative Example 2

The secondary battery was fabricated with the same method used in Comparative Example 1 except that only the positive electrode active material particles D were used.

Performance test

Output Characteristic Test

A test result of measuring resistance through a voltage drop for 10 seconds with respect to a pulse current in SOC 50 is represented in a following table 1.

TABLE 1

| Items | Rdis@SOC 50 (mΩ) |
|---|---|
| Example 1 | 0.91 |
| Example 2 | 0.92 |
| Comparative Example 1 | 0.97 |
| Comparative Example 2 | 0.92 |

High-Temperature Service Life Test

A graph illustrating recovery capacity and resistance change after finishing 60° C. high-temperature storing of 4.25V fully charged battery at one week intervals is represented in the FIGURE.

Capacity Retention Rate Test

Capacity retention rate and resistance change rate after 5 weeks of high-temperature storing is represented in Table 2.

TABLE 2

| Items | Capacity retention rate (%) | Resistance change rate (%) |
|---|---|---|
| Example 1 | 95.7 | 18 |
| Example 2 | 96.0 | 11 |
| Comparative Example 1 | 95.3 | 17 |
| Comparative Example 2 | 91.3 | 27 |

Capacity retention rate: discharge capacity/1st discharge capacity*100 (%) after 5 weeks of storing Resistance increase rate: R@SOC50/1$^{st}$ R@SOC50 after 5 weeks of storing According to the Examples described above, when the large-grain material having excellent output characteristic and the small-grain material having excellent high-temperature durability are combined, effects can be obtained in which output characteristic can be enhanced than when each material is used alone, while the same performance in the high-temperature storing can be obtained as if large-grain material alone is used.

The present disclosure has been described in detail. However, it should be understood that the detailed description and specific examples, while indicating preferred embodiments of the disclosure, are given by way of illustration only, and various changes and modifications within the scope of the disclosure will become apparent to those skilled in the art from this detailed description.

What is claimed is:

1. A mixed positive electrode active material, comprising:
a large-grain positive electrode active material having an average diameter of 10 µm or greater, and a small-grain positive electrode active material having an average diameter of 5 μm or less; and a coating layer disposed on a surface of each of the large-grain positive electrode active material and the small-grain positive electrode active material, wherein the coating layers disposed on the surface the large-grain positive electrode active material and the coating layer disposed on the surface of the small-grain positive electrode active comprise respectively different materials, wherein one of the materials is a lithium boron oxide- based composition and the other of the materials is a metal oxide.

2. The mixed positive electrode active material of claim 1, wherein the lithium boron oxide-based composition includes one of lithium metaborate, lithium triborate, lithium tetraborate, lithium pentaborate, lithium heptaborate and lithium octaborate, or mixtures of at least two of them.

3. The mixed positive electrode active material of claim 1, wherein the lithium boron oxide-based composition includes one of $LiBO_2$, $LiBO_3$, $LiB_3O_5$, $Li_2B_3O_7$, $Li_2B_4O$, $Li_2B_4O_7$, $Li_2B_5O_8$, $LiB_7O_{12}$, $Li_2B_8O_{13}$ and $Li_{10}B_8O_{24}$, or mixtures of at least two of them.

4. The mixed positive electrode active material of claim 1, wherein the lithium boron oxide-based composition is derived from boron (B), a boron (B) compound or combinations thereof.

5. The mixed positive electrode active material of claim 4, wherein the boron (B) compound includes boric acid ($H_3BO_3$).

6. The mixed positive electrode active material of claim 4, wherein the coating layer including the lithium boron oxide-based composition is formed by mixing the positive electrode active material with the boron (B), the boron (B) compound or combination thereof, and performing thermal treatment.

7. The mixed positive electrode active material of claim 1, wherein the coating layer including the metal oxide is formed by mixing the positive electrode active material with the metal oxide, and performing thermal treatment.

8. The mixed positive electrode active material of claim 1, wherein the lithium in the coating layer including the lithium boron oxide-based composition is present in an amount of 0.05 to 0.2 parts by weight based on 100 parts by weight of the total weight of the large-grain positive electrode active material or the small-grain positive electrode active material.

9. The mixed positive electrode active material of claim 1, wherein the metal oxide includes one of magnesium oxide, alumina, niobium oxide, titanium oxide and tungsten oxide, or mixtures of at least two of them.

10. The mixed positive electrode active material of claim 1, wherein a weight ratio between the large-grain positive electrode active material including the coating layer and the small-grain positive electrode active material including the coating layer is 5:5 to 8:2.

11. The mixed positive electrode active material of claim 1, wherein at least one of the large-grain positive electrode active material and the small-grain positive electrode active material is lithium·nickel·manganese·cobalt complex oxide (NMC).

12. The mixed positive electrode active material of claim 11, wherein the lithium·nickel·manganese·cobalt complex oxide is $Li_{(1+\delta)}Mn_xNi_yCo_{(1-x-y-z)}M_zO_2$ (M is at least one element selected from the group consisting of Ti, Zr, Nb, Mo, W, Al, Si, Ga, Ge and Sn, and $-0.15<\delta<0.15$, $0.1\leq x\leq 0.5$, $0.6<x+y+z<1.0$, $0\leq z\leq 0.1$).

13. A positive electrode, comprising:
an electrode current collector; and
a positive electrode active material layer formed on at least one surface of the electrode current collector and comprising the mixed positive electrode active material according to claim 1, a conductor, and a binder.

14. The positive electrode of claim 13, wherein the conductor is at least one selected from the group consisting of graphite, carbon black, acetylene black, ketjen black, channel black, furnace black, lamp black, thermal black, carbon fiber, metal fiber, fluorocarbon, aluminum powder, nickel powder, zinc oxide, potassium titanate and titanium oxide, and the binder is at least one selected from the group consisting of polyvinylidene fluoride, vinylidene fluoride-hexafluoropropylene copolymer (PVDF-co-HFP), polyvinyl alcohol, carboxymethyl cellulose (CMC), starch, hydroxypropylcellulose, regenerated cellulose, polyvinylpyrrolidone, polytetrafluoroethylene, polyethylene, polypropylene, ethylene-propylene-diene ter polymer (EPDM), sulfonated EPDM, styrene butadiene rubber (SBR), fluorine rubber, polyacrylonitrile, and polymethylmethacrylate.

15. The positive electrode of claim 13, wherein the positive electrode is for a secondary battery.

16. A method for fabricating a mixed positive electrode active material, comprising:
(S1) preparing a large-grain positive electrode active material having an average diameter of 10 μm or greater and a small-grain positive electrode active material having an average diameter of 5 μm or less;
(S2) mixing the large-grain positive electrode active material or the small-grain positive electrode active material with boron (B), a boron (B) compound or combination thereof, and performing thermal treatment to form a coating layer including a lithium boron oxide-based composition on a surface of the large-grain positive electrode active material or the small-grain positive electrode active material to form a first coated positive electrode active material;
(S3) mixing a positive electrode active material that has not gone through the (S2) among the large-grain positive electrode active material and the small-grain positive electrode active material with a metal oxide, and performing thermal treatment to form a coating layer including metal oxide on a surface of the positive electrode active material to form a second coated positive electrode active material; and
(S4) mixing first coated positive electrode active material, the second coated positive electrode active material, a conductor and a binder.

17. The method for fabricating a mixed positive electrode active material of claim 16, wherein the thermal treatment in the step of forming the coating layer including the lithium boron oxide-based composition is performed between 250 and 500° C., and
the thermal treatment in the step of forming the coating layer including the metal oxide is performed between 300 and 800° C.

18. The method for fabricating a mixed positive electrode active material of claim 16, wherein the thermal treatment is performed under an atmospheric environment.

19. The method for fabricating a mixed positive electrode active material of claim 16, wherein the boron (B), the boron (B) compound or combination thereof is present in an amount of 0.05 to 0.2 parts by weight based on 100 parts by weight of the total weight of the positive electrode active material.

20. The method for fabricating a mixed positive electrode active material of claim 16, wherein the metal oxide is present in an amount of 0.05 to 0.2 parts by weight based on 100 parts by weight of the total weight of the positive electrode active material.

* * * * *